No. 667,189. Patented Feb. 5, 1901.
G. H. CONDICT.
BATTERY BOX OR TRAY FOR MOTOR VEHICLES.
(Application filed Sept. 3, 1898. Renewed July 12, 1900.)
(No Model.) 2 Sheets—Sheet 1.
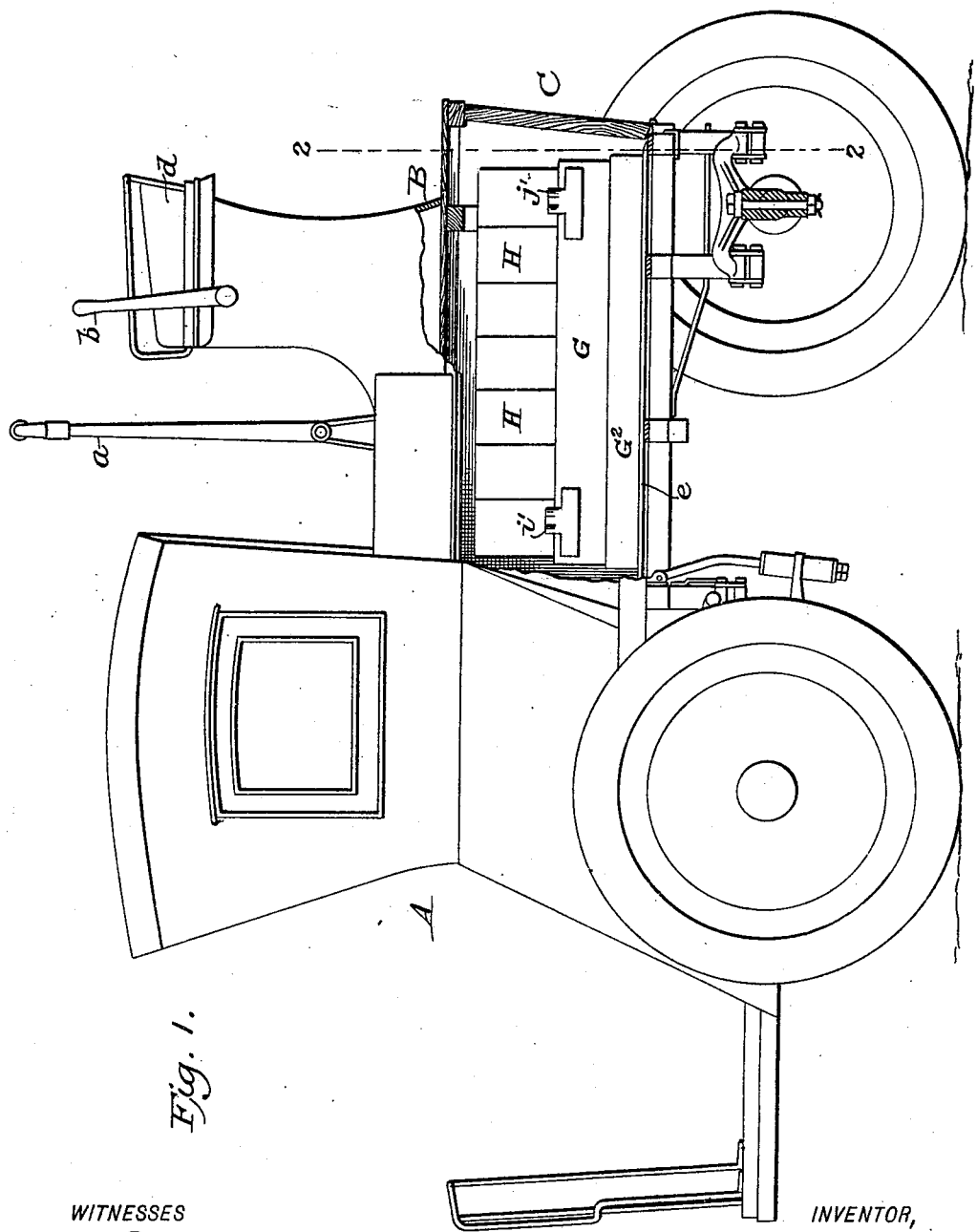
WITNESSES
INVENTOR,
George Herbert Condict,
BY
HIS ATTORNEY No. 667,189. Patented Feb. 5, 1901.
G. H. CONDICT.
BATTERY BOX OR TRAY FOR MOTOR VEHICLES.
(Application filed Sept. 3, 1898. Renewed July 12, 1900.)
(No Model.) 2 Sheets—Sheet 2.
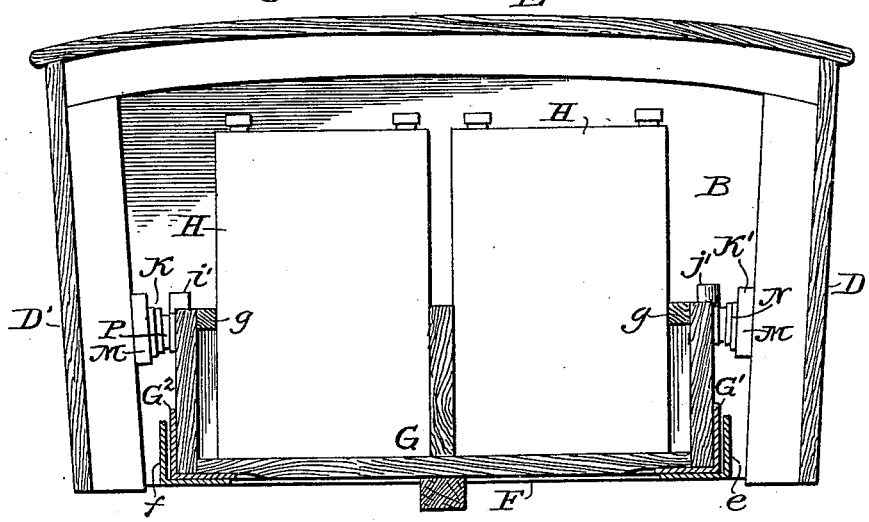
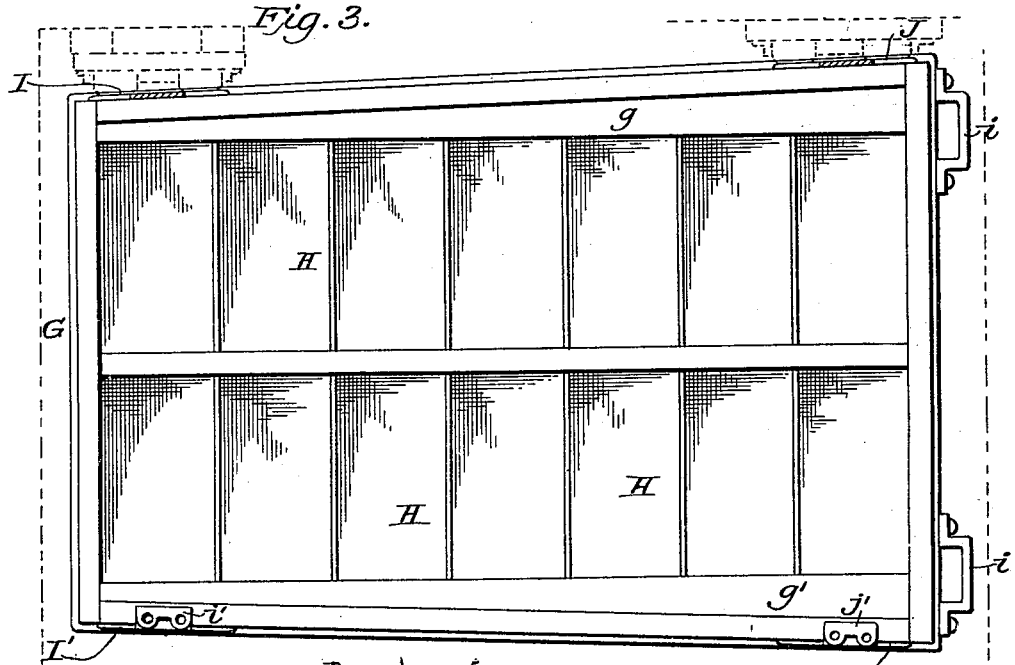
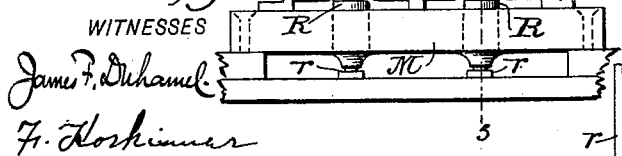
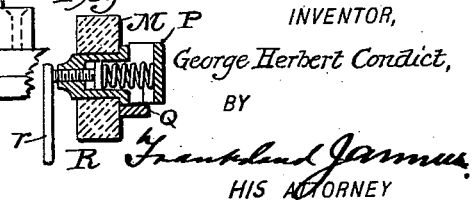
WITNESSES
James F. Duhamel
F. Hoskinner
INVENTOR,
George Herbert Condict,
BY
Frankland James
HIS ATTORNEY
THE NORRIS PETERS CO., PHOTO-LITHO., WASHINGTON, D. C.

UNITED STATES PATENT OFFICE.

GEORGE HERBERT CONDICT, OF NEW YORK, N. Y., ASSIGNOR, BY MESNE ASSIGNMENTS, TO THE COLUMBIA AND ELECTRIC VEHICLE COMPANY, OF JERSEY CITY, NEW JERSEY, AND HARTFORD, CONNECTICUT.

BATTERY BOX OR TRAY FOR MOTOR-VEHICLES.

SPECIFICATION forming part of Letters Patent No. 667,189, dated February 5, 1901.

Application filed September 3, 1898. Renewed July 12, 1900. Serial No. 23,322. (No model.)

*To all whom it may concern:*

Be it known that I, GEORGE HERBERT CONDICT, a citizen of the United States of America, and a resident of New York, in the county of New York and State of New York, have invented certain new and useful Improvements in Battery Boxes or Trays for Motor-Vehicles, of which the following is a specification.

The present invention is in connection with electrically-propelled vehicles of the type in which the motive current is supplied by storage batteries which are removed when exhausted and replaced by others which have been charged. The improvements relate to the vehicle itself and to automatic electrical contacts thereon and to the tray or receptacle in which the storage batteries are contained, so as to be handled as a single unit.

The vehicle itself, which may be of any desired or known type and construction, is provided with an inclosed compartment which I have called the "battery-box." This is preferably at the rear portion of the vehicle, although it may be elsewhere, and is provided with a suitable door to permit loading and unloading the batteries.

On account of the great weight of storage batteries sufficient to operate a vehicle for any considerable length of time the matter of handling and replacing the spent batteries is of great importance. I therefore arrange the desired number of cells of battery in a tray, where they are suitably connected to form a unit sufficient for the purpose. The battery-containing trays should be of substantially similar outward dimensions and shape. In the interior of the battery-box are located a number of contacts, which are placed in the same relative positions in the different vehicles in order to automatically engage and make contact with corresponding contacts on the trays, and there may be any desired number of these contacts, four, however, being usually sufficient. The trays, with their load of batteries, are heavy and not very readily displaced, yet it is exceedingly desirable to secure good electrical connections and also to secure them so that they cannot be moved by the jolting of the vehicle. These and other advantages are secured by constructing the trays so that on their exterior they are wedge-shaped—that is, narrower at their front end and increasing in width toward the rear—and I have also so located the stationary contacts in the battery-box that when the tray has been inserted endwise and pushed in into its final position the corresponding contacts carried thereby are wedged firmly against and between the contacts on the vehicle, automatically making a perfect electrical connection and at the same time firmly holding the trays in position, so that they have no latitude of movement and cannot be started by jolting, since the contacts are all hard and fast against each other and all motion of the battery-tray is prevented. The insertion of the tray is also greatly facilitated. Furthermore, by constructing the battery-tray so that it has a smaller dimension in front than at its rear, that where it is pushed into the vehicle by mechanical means, some latitude of adjustment in the positioning of the vehicle to receive it is permissible and facilitates the operation, and without damage to the contacts in the battery box or receptacle. Where the contacts in the vehicle are on parallel lines, the said vehicle must be positioned with great exactness, since otherwise the operation of loading is interfered with and damage may result. With my improved construction the tapering portions of the tray enter at the widest part of the receptacle and the tray guides itself into position. It further follows that a somewhat less exact and expensive construction of the receptacle in the vehicle is also practicable and safe.

I have not considered it necessary to illustrate the electric propelling mechanism of the vehicle in this application further than to show the lever by which the flow of current is controlled and the lever by which the steering apparatus is operated.

Other details of construction will be hereinafter set forth, and pointed out and referred to in the appended claims.

Figure 1 is a side elevation showing an electrically-propelled vehicle, the rear portion being broken away to show the interior of the battery-box with batteries in position. Fig. 2 is a transverse cross-section of the battery-box on the line 2 2, Fig. 1. Fig. 3 is a plan view of a battery-tray, showing also in dotted lines a portion of the battery-box, with contacts. Fig. 4 is an enlarged detailed view of one of the stationary contacts in the battery-box; and Fig. 5 is a sectional view thereof on the line 5 5 of Fig. 4.

In the drawings, Fig. 1, A is an electrically-propelled vehicle illustrated in the form of a cab.

B, which, as shown, is an extension of the rear end thereof, is the battery-box, which is closed by the hinged door C, and has the sides D D', the top E, and the bottom F. Two pieces of angle-iron $e f$ are secured to the bottom F at the proper distance apart to form supporting and retaining tracks and are arranged at an angle to receive the tray and to securely hold it when fully inserted—that is, in its operative position.

G is the tray, which is desirably constructed of insulating material, as wood, vulcanized fiber, hard rubber, or the like; but as indicated it is of wood. Its interior is preferably rectangular in form, so as to contain a number of standard secondary-battery cells H. The exterior of the tray G is, however, made tapering or wedge-shaped in form, being narrower at its front than at its rear end. In this instance two tapered bars of wood $g g'$ are interposed between the batteries and the sides of the tray to hold them securely in position. Upon the exterior of the sides of the tray G are secured two pairs of stationary metallic contacts I I' J J', and these correspond in position with and engage similar contacts K K' L L', fixed to the sides of the interior of the battery-box. Handles or catches $i i$ are attached to the rear end of the battery-box for connecting with mechanism for drawing it out or pushing it in. Angle-irons $G' G^2$ are secured to the lower corners of the tray to correspond with and slide upon the angle-irons $e f$, forming ways in the bottom of the battery-box.

The driver's seat $d$ is in an elevated position at the rear of the vehicle and above the battery-box, and $b$ is the handle of the controlling apparatus by which the flow of current is regulated. The direction of travel of the vehicle is controlled by steering apparatus operated through a lever $a$ in front of the driver's seat.

The contacts I I' J J' of the battery-tray G are strips of good conducting material, which are fixed permanently thereto and are provided with lugs $i' j'$, to which the cells are connected. The contacts K K' L L' of the battery-box are yielding or elastic in their construction and may vary considerably in form.

I find the construction shown in Figs. 4 and 5 to be satisfactory in practice. In said figures, M is a piece of good insulating material—as, for instance, porcelain. N is a frame of metal into which are fitted a pair of contact-surfaces O P. These surfaces are capable of lateral movement toward the block M and are held outward by springs Q. Extending through the block are two metallic housings R R, which being hollow admit the springs and hold them in position, as is more clearly apparent from the sectional view, Fig. 5. An adjusting-screw having a handle $r$ is screwed in at the rear of each of said housings and serves to force them forward to increase the tension of springs Q, or vice versa.

The form and type of the secondary batteries H are not herein referred to since they may be varied without in any way affecting the present invention, nor have I mentioned the connections between the cells of the secondary batteries H for the same reason. The circuit connections from the stationary contacts K K' L L' of the battery-box are preferably soldered into holes $p$ in the contact-pieces O P and extend to the controller which is operated by the hand-lever $b$, and as these may vary they are not specifically referred to. If preferred, the contact devices upon the exterior of the battery-box may be arranged so as to be substantially at equidistant positions, and the contacts upon the tray might also be so arranged, and the tray might be held in position together by the angle-iron ways, between which it slides into position; but I find that the arrangement here described possesses distinct advantages in practice, since as soon as the tray begins to be withdrawn the contacts separate and the danger of injuring them by excessive friction is minimized. The insertion of a new tray of batteries is also greatly facilitated by having the entering end narrower than the ways between which it is to move, and this is more particularly true in view of the weight of the battery and the desirability of handling it quickly in order to diminish the time during which the vehicle is out of service.

While I have referred to secondary or storage batteries, that being the type most desirably employed in this connection, it must be understood that the invention is not limited thereto, but that any sort of batteries may be carried in the tray G and instantly connected or disconnected with the working circuit on the vehicle when the tray is inserted or removed.

It will be apparent that in view of the foregoing description the details of construction may be varied without departing from the invention.

Having described my invention, what I claim is—

1. A tray adapted to contain a group of electric-battery cells, said tray formed with a tapering or wedge-like exterior portion and provided with a plurality of contact-pieces connected with the battery-cells and located at points of different width upon the exterior of the tray.

2. In combination, a tray adapted to contain a group of electric-battery cells, said tray formed with a tapering or wedge-like exterior portion and provided with a plurality of contact-pieces connected with the battery-cells and located at points of different width upon the exterior of the tray, an electric vehicle having a battery box or receptacle adapted to receive the tray endwise and provided with yielding contact-pieces corresponding with those on the tray when the latter is in operative position.

3. In an electric vehicle, a battery box or receptacle to receive a storage battery, a battery-tray adapted to contain electric-battery cells, said tray being of narrower exterior dimension at the end first introduced into the receptacle.

4. The combination with a battery-compartment having an opening at its rear end and provided with two or more sets of stationary contact-pieces, of a battery-containing tray also provided with fixed contact-pieces secured to and located at points of different width on the exterior of the tray and adapted when said tray is inserted endwise into the battery-box, to engage the corresponding contacts in said box when the tray is in operative position.

5. The combination with an electrically-propelled vehicle, of a battery box or receptacle therein having ways therein arranged at an angle and a tray adapted to contain storage batteries and tapering in construction to conform to the angle of the ways and adapted to rest in and be guided and held in position thereby.

6. The combination in an electrically-propelled vehicle, of a battery box or receptacle having angle-iron tracks or ways arranged in convergent lines, a tray having a tapering or wedge-like exterior dimension and adapted to contain storage batteries and provided with protective strips upon its tapering portion said strips adapted to slide in the ways of the battery-box to guide the tray into operative position and to prevent lateral movement thereof.

7. The combination in an electrically-propelled vehicle formed with a battery box or receptacle, of a plurality of yielding contacts and electrical connections extending therefrom, of a tray having a tapering exterior dimension and adapted to contain the standard-charged batteries, and provided with stationary contacts corresponding with those in the battery box or receptacle, said contacts located at points of different width upon the exterior of the tray, and adapted when said tray is in position to engage and make contact therewith.

8. A battery-tray adapted to contain storage batteries, constructed in tapering or wedge-like form and provided with a plurality of fixed contacts, said contacts located at points of different width upon the exterior of its tapering portion, in combination with a receptacle therefor, said receptacle provided with stationary contacts, arranged to engage those on the tray when the latter is in operative position.

Signed by me at New York, N. Y., this 2d day of September, 1898.

GEORGE HERBERT CONDICT.

Witnesses:
FRANKLAND JANNUS,
CHAS. E. DUROSS.